Feb. 10, 1959 R. F. HAUTLY 2,873,103
SEISMOLOGICAL INSTRUMENTS
Filed Oct. 7, 1953 3 Sheets-Sheet 1

Rudolf F. Hautly,
Inventor.
Koenig and Pope,
Attorneys.

Feb. 10, 1959 R. F. HAUTLY 2,873,103
SEISMOLOGICAL INSTRUMENTS
Filed Oct. 7, 1953 3 Sheets-Sheet 2

Rudolf F. Hautly,
Inventor.
Koenig and Pope,
Attorneys.

Feb. 10, 1959
R. F. HAUTLY
2,873,103
SEISMOLOGICAL INSTRUMENTS
Filed Oct. 7, 1953
3 Sheets-Sheet 3
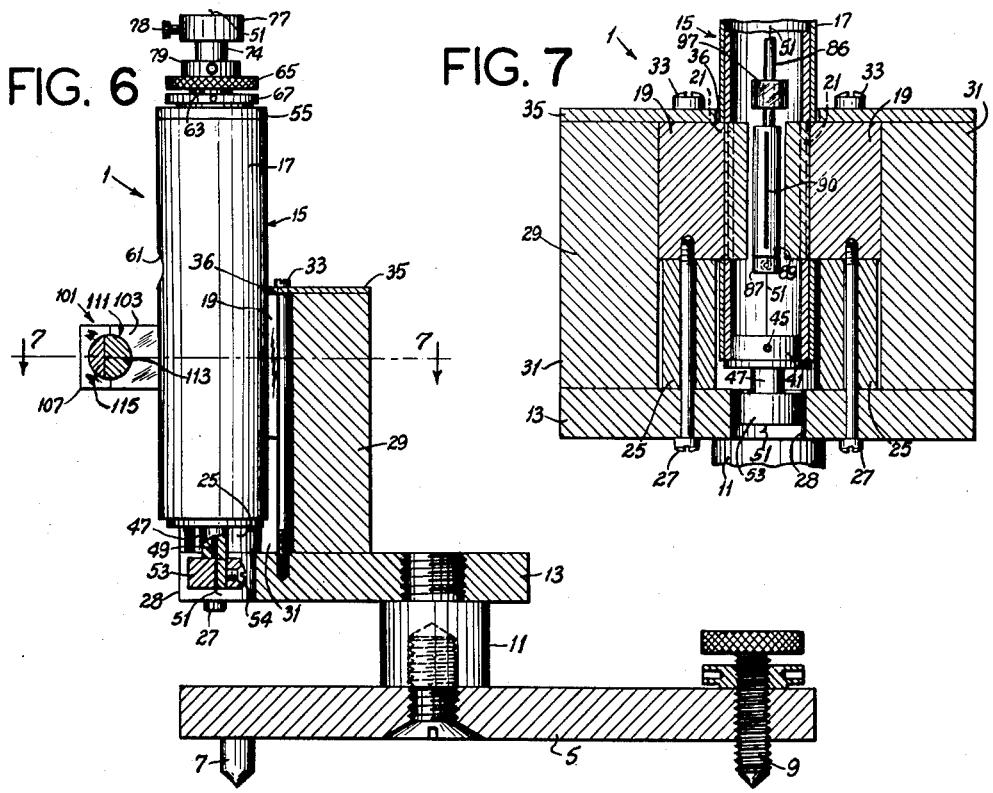
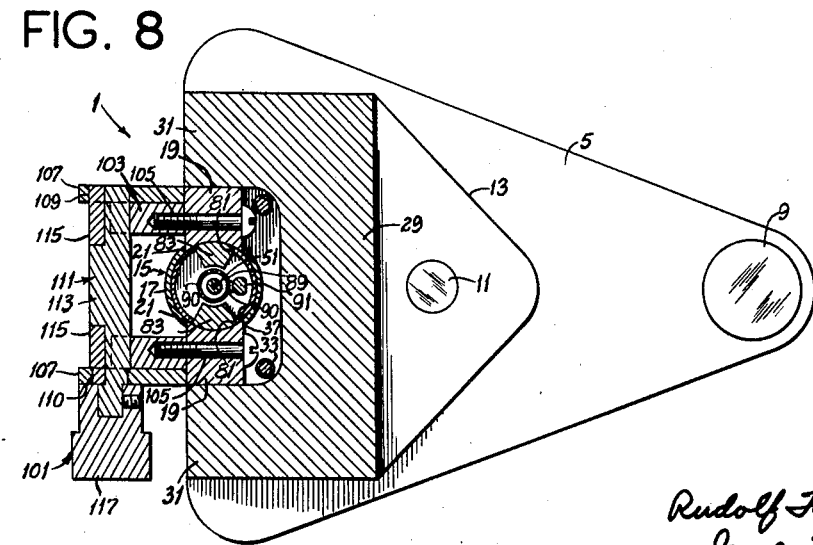
Rudolf F. Hautly,
Inventor.
Koenig and Pope,
Attorneys.

United States Patent Office 2,873,103
Patented Feb. 10, 1959

2,873,103

SEISMOLOGICAL INSTRUMENTS

Rudolph F. Hautly, University City, Mo., assignor to W. F. Sprengnether Instrument Company, Inc., St. Louis, Mo., a corporation of Missouri Application October 7, 1953, Serial No. 384,701

11 Claims. (Cl. 264—1)

This invention relates to seismological instruments, and more particularly to accelerometers of this class.

Among the several objects of the invention may be noted the provision of improved accelerometers adapted for accurately measuring the acceleration of earth movement as occurs during an earth quake; the provision of an accelerometer of this class having a torsional vibration system with improved means for damping the vibrations of the system; the provision of an accelerometer of this class wherein the damping means is such as to effect substantially linear damping of the system; the provision of an accelerometer of this class in which the torsional vibration system is contained in a cartridge, acting only in response to frequencies in a predetermined range, with the cartridge being removable and replaceable by other cartridges containing torsional vibration systems responsive to frequencies in other ranges; the provision of an accelerometer of this class wherein the damping means is operative upon the torsional vibration system of any cartridge which may be in use in the accelerometer; and the provision of an accelerograph utilizing one or more accelerometers of this invention in conjunction with a film recorder for photographically recording a trace corresponding to the damped oscillation of the vibration system for making acceleration measurements. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a view in side elevation of the assembly of an accelerometer of this invention and a film recorder to form an accelerograph;

Fig. 6 is an enlarged vertical section taken on line 6—6 of Fig. 2;

Fig. 7 is a horizontal cross section taken on line 7—7 of Fig. 6; and,

Fig. 8 is an enlarged partial vertical section taken on line 8—8 of Fig. 2.

Corresponding reference characters indicate corresponding parts throughout the several views of the drawings.

Figure 1:
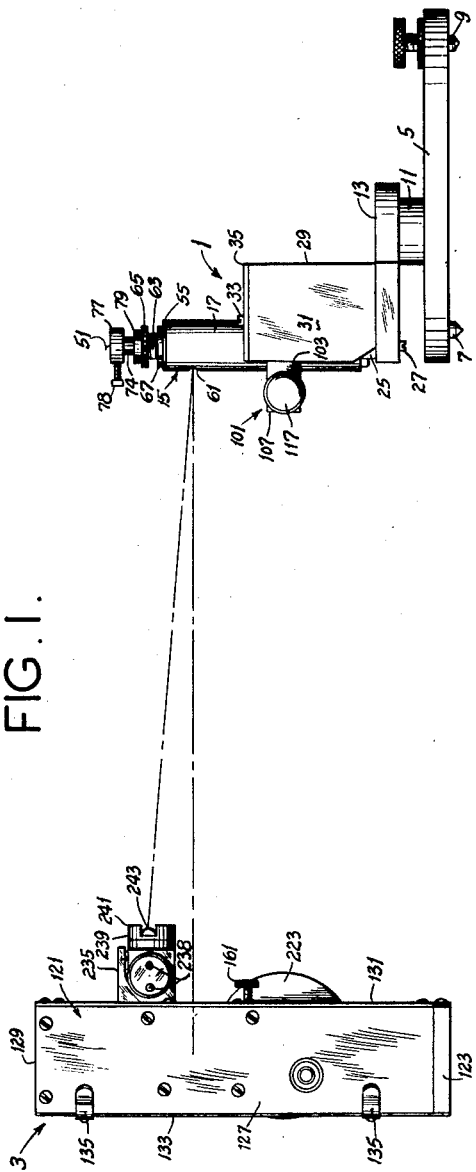
Figure 2:
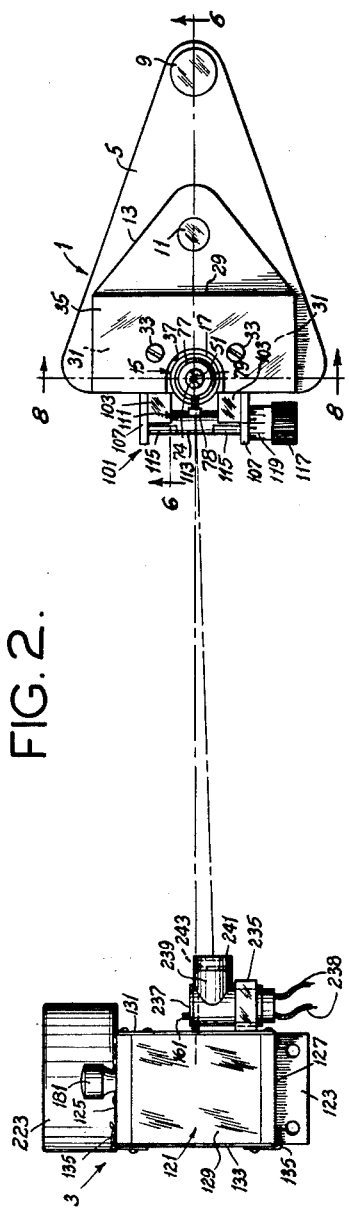
Fig. 2 is a plan of Fig. 1.
Figure 4:
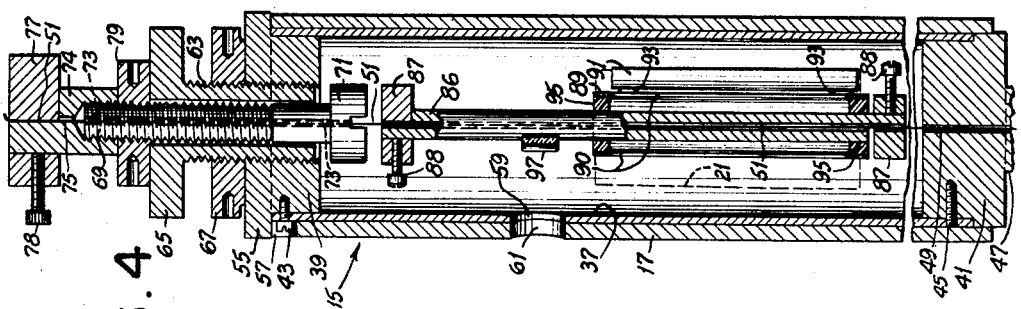
Fig. 4 is an enlarged vertical section taken on line 4—4 of Fig. 3, partly broken away.

Referring to the drawings, Figs. 1 and 2 illustrate an accelerometer 1 of this invention as it is used in conjunction with a film recorder 3 of this invention to constitute an accelerograph. The accelerometer 1 is adapted to measure the acceleration of earth movement such as occurs during an earthquake, and the film recorder, as used in conjunction therewith, makes a recording on photographic film of the measurements.

The accelerometer 1 comprises a tripod base 5 having two fixed legs 7 and a third leg constituted by a leveling screw 9. On the base is fixed a post 11 supporting a platform 13. The base, post and platform are nonmagnetic, being made of a material such as aluminum. At 15 is indicated an assembly of a housing 17 constituted by a cylindrical sleeve made of nonmagnetic material, such as brass, and a pair of magnetic pole pieces 19. The pole pieces 19 extend outward from the housing 17 on opposite sides thereof. The housing has a pair of diametrically opposed longitudinal slots 21, and the pole pieces 19, at their inner ends, reach into the slots, being fixed to the sleeve as by brazing. The inner end faces of the pole pieces 19 are curved to coincide with the cylindrical inside surface of the housing 17. The assembly 15 (housing 17 and pole pieces 19) is mounted on the platform 13 with the housing 17 in vertical position by means of nonmagnetic tubular posts 25 supporting the pole pieces 19. Screws 27 of nonmagnetic material such as brass extend through holes in the platform and through the tubular posts with their upper ends threaded in tapped holes in the pole pieces 19. The assembly 15 is positioned at one edge of the platform, this edge being regarded as its forward edge, with the housing 17 aligned with a notch 28 in this edge of the platform. The posts 25 are located on opposite sides of the notch.

At 29 is shown a C-shaped permanent magnet of high coercive force, such as an Alnico magnet. The poles of this magnet are designated 31. It is mounted lying horizontally on the platform straddling the assembly 15, with its poles 31 extending across and closely adjacent the outer ends of the pole pieces 19. The spacing of the inside faces of the poles 31 across the C is slightly greater than the distance between the outer end faces of the pole pieces 19, and the magnet 29 is readily mounted in position by sliding it on the platform into straddling relation with respect to the assembly 15. The magnet 29 is held fixed in its assembled position on the platform by means of long screws 33 which extend through holes in a nonmagnetic cover plate 35 (made of aluminum, for example), the lower ends of the screws being threaded in tapped holes in the platform 13. The cover plate 35 has a notch 36 accommodating the housing 17.

Slidably telescoped in the housing 17 is a cartridge 37 comprising a cylindrical tube of nonmagnetic material such as brass. The cartridge has a head 39 at its upper end and a head 41 at its lower end. These heads are fixed in a position by upper and lower set screws 43 and 45, respectively. The upper screw 43 projects out from the cartridge; the lower screw 45 is flush with the cartridge. The lower head 41 has a downwardly extending axial stem 47 of semicylindrical cross section at its lower end, with an axial bore 49 from the upper end of the head to the semicylindrical lower end of the stem. Bore 49 receives the lower end of a suspension wire 51, such as a phosphor bronze wire. This wire extends downward out of the bore upon the flat of the semicylindrical lower end of the stem, being clamped against the flat by a clamp member 53 having a semicircular opening receiving the semicylindrical end of the stem and having a clamp screw 54.

The upper head 39 has a flange 55 projecting beyond the cartridge 37 for engagement with the upper end of the housing 17 to determine the proper heightwise position of the cartridge as inserted in the housing. The upper set screw 43 is receivable in a notch 57 at the upper end of the housing 17 to determine the proper angular orientation of the cartridge with respect to the housing. This heightwise and angular orientation of the cartridge in the housing is such as to obtain registry of a window opening 59 in the cartridge with a window opening 61 in the front of the housing. Adjustably threaded in the upper head 39 is an axially located tubular screw member 63 having a knob 65 at its upper end. This screw member may be threaded into and out of the head 39 to locate it in different positions of axial adjustment, and is adapted to be locked in adjusted position by means of a lock nut 67. A screw 69 extends upward from within the cartridge through the tubular member 63, being rotary in the latter on the axis of the cartridge. The screw 69 has a head 71 below the head 39. Its upper end extends out of the member 63. It has an axial bore 73 for receiving the suspension wire 51. Threaded on the upper end of the screw 69 is a fitting 74 of semicylindrical cross section at its upper end. The fitting has a bore 75 for reception of the wire 51, the wire extending upward out of the bore 75 upon the flat of the semicylindrical upper end of the fitting, and being clamped against the flat by a clamp member 77 similar to clamp member 53 and having a clamp screw 78. Fitting 74 is rotary together with screw 69 to adjust the torsion of the wire 51, and is adapted to be locked in adjusted position by means of a lock nut 79 threaded on the screw 69 below the fitting 74. The longitudinal or vertical position of the fitting 74 is adjustable by turning screw member 63 to adjust the tension of the wire 51.

Figure 5:
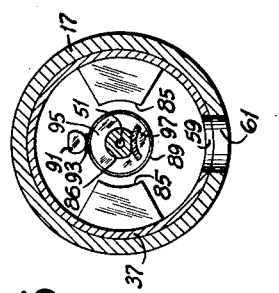
Fig. 5 is an enlarged horizontal section taken on line 5—5 of Fig. 3.

The cartridge 37 has a pair of diametrically opposed longitudinal slots 81 receiving the outer ends of a pair of pole extensions or pieces 83 of magnetizable material such as soft iron fixed to the cartridge as by brazing. These pole pieces 83 extend inward toward the center of the cartridge, being of tapered horizontal cross section convergent toward the center of the cartridge. Their outer ends are curved to coincide with the outside cylindrical surface of the cartridge (and the curved inner end faces of pole pieces 19). The pole pieces 83 have relatively narrow curved inner end faces 85 (see Fig. 5) spaced on opposite sides of the axis of the cartridge, with a gap therebetween. The pole pieces 83 are located to mate with the pole pieces 19 when the cartridge is fully inserted into the sleeve and angularly orientated via reception of set screw 43 in the notch 57.

Fixed on the wire 51 inside the cartridge 37 is a long slender tube 86 of nonmagnetic material such as brass. The ends of this tube 86 are of semicylindrical cross section and have clamp members 87 similar to member 53 with clamp screws 88 for clamping the wire against the flats of the semicylindrical ends. Mounted on the tube 86 toward its lower end is a sleeve 89 of highly electrically conductive material such as silver. This sleeve 89 has a pair of longitudinal slots 90 on diametrically opposite sides. It carries an eccentric weight 91 consisting of a bar of brass or the like spaced outward from the sleeve by spacers 93 and extending longitudinally of the sleeve. The sleeve 89 is mounted in spaced relation with respect to the tube 86 by means of spacer rings 95 of electrical insulation material, such as plastic. The sleeve 89 occupies the gap between the faces 85 of pole pieces 83 and is rotary in the gap. The bar 91 is located in the space in the cartridge 37 to the rear of the pole pieces 83. The tube 86 extends up out of the sleeve 89 and, above the sleeve, carries a concave mirror 97 facing the registering window openings 59 and 61.

The tension and torsion of the suspension wire 51 are so adjusted in the manner previously described that the wire and the parts carried thereby constitute a torsional vibration system oscillative on the axis of the wire in response to a seismic disturbance provided that the direction of the disturbance is such as to cause a force to act on the eccentric bar 91 normal to the plane including the wire and the bar and provided that the frequency of the disturbance is within the range of frequencies to which the system is responsive. This range is determined primarily by the mass and eccentricity of bar 91. Vibration of the system is damped by the action of the magnetic field established by the permanent magnet 29 and concentrated by pole pieces 19 and 83 across the gap between the faces 85 of poles 83 in which the sleeve 89 oscillates, noting that oscillation of the sleeve in the concentrated magnetic field in this gap sets up eddy currents in sleeve. The slots in the sleeve strengthen the damping effect. Since the sleeve 89 is cylindrical, and the weight or bar 91 is outside the concentration of magnetic flux across the gap, the damping effect is a substantially linear function of the change in angular position of the sleeve as it oscillates on the axis of the wire.

At 101 is shown means of this invention for varying the intensity of the linear damping action by variably shunting the portion of the magnetic circuit across the gap between the pole pieces 83 in the magnetic circuit established by the permanent magnet 29 and pole pieces 19 and 83 to increase or decrease the strength of the magnetic field in the gap. This adjusting means comprises a pair of by-pass pole pieces 103 fixed to the pole pieces 19 by screws 105 and extending forward from pole pieces 19 at opposite sides of the housing 17. On the outer sides of the by-pass pole pieces are brazed plates 107 of nonmagnetic material such as brass. These plates extend past the by-pass pole pieces and have openings 109 and 110 at their forward ends for journalling a by-pass armature generally designated 111. This armature comprises an initially cylindrical rod of magnetic material 113 which, in the regions of the ends of pole pieces 103, is cut away to provide part-cylindrical recesses in which are brazed part-cylindrical inserts 115 of nonmagnetic material such as brass. The outer ends of the pole pieces 103 are curved to coincide with the cylindrical surface of the armature. A knob 117 is fixed on one end of the armature outward of the respective plate 107.

When the armature is in the position shown in Fig. 6 wherein the brass inserts 115 are directed away from and out of engagement with the ends of the by-pass pole pieces 103, the by-pass means diverts or by-passes a maximum amount of magnetic flux from the gap between poles 83, and the strength of the magnetic field in the gap is a minimum. By turning the armature from this position to rotate the magnetic sections of the armature out of engagement with the pole pieces 103, the diversion of flux is decreased, minimum diversion being obtained when the armature is turned 180° from its Fig. 6 position. Knob 117 may be provided with calibrations as indicated at 119 cooperable with an index mark on the adjacent plate 107 to indicate the armature setting.

The film recorder 3, as shown in Figs. 1 and 2, comprises a case generally designated 121 having a base 123, sides 125 and 127, a top 129, a front 131, and a removable back 133. The back has spring clips 135 for holding it in light-tight relation against the back edges of the base, sides and top of the case. Mounted on the front of the case 121 is a bracket 235 in which is rotary a light projector comprising a cylindric housing 237 for an electric lamp. Leads to the lamp are shown at 238. The housing 237 is rotary on an axis transverse to the case. It has a radial lens tube 239 carrying a lens mount 241 at its forward end with a lens 243 in the mount. It converges light from the lamp in housing 237 to a plane beam transverse to the case 121. The accelerometer and film recorder 3 are set up as illustrated in Figs. 1 and 2. Housing 237 is angularly positioned to direct the plane beam of light issuing from lens 243 through window openings 61 and 59 in the housing 17 and cartridge 37 of the accelerometer to the concave mirror 97, with the beam reflecting from the mirror through a series of slots and a lens to impinge on a moving strip of film F contained within recorder 3. The beam impinges on the mirror as a line extending transversely across the mirror. Since the mirror is concave, and the film is at its focal point, the beam reflected from the mirror impinges substantially as a point on the film, fine focus being obtained by adjusting the recorder lens.

The motor 223 and the lamp in housing 237 are under control of a normally open switch (not shown) which closes in response to the occurrence of any seismic disturbance of sufficient amplitude and duration to warrant recording its acceleration. Such switches are known, and since they do not constitute part of this invention will not be described. Upon the occurrence of a seismic disturbance of sufficient amplitude to close this switch and energize the motor, and a beam of light is reflected from the mirror 97 impinging substantially as a point on the film F. It is contemplated that a timer may be utilized to keep the motor and lamp energized for a predetermined period (one minute, for example), then shut them off. In such case, if the disturbance persists for more than the predetermined period, the motor and lamp will be immediately re-energized after shutting off.

If the direction and frequency of the seismic disturbance is such as to cause oscillation of the torsional vibration system in cartridge 37 on the axis of wire 51, the mirror is oscillated on this axis and the point of light is swept transversely back and forth across the film. Since the film is being concurrently fed past the slit, a trace corresponding to the oscillation of the mirror is recorded on the film, from which a measurement of the acceleration of the disturbance may be readily taken after development of the film. Different cartridges having torsional vibration systems responsive to different ranges of frequency may be readily inserted in the housing 17.

Figure 3:
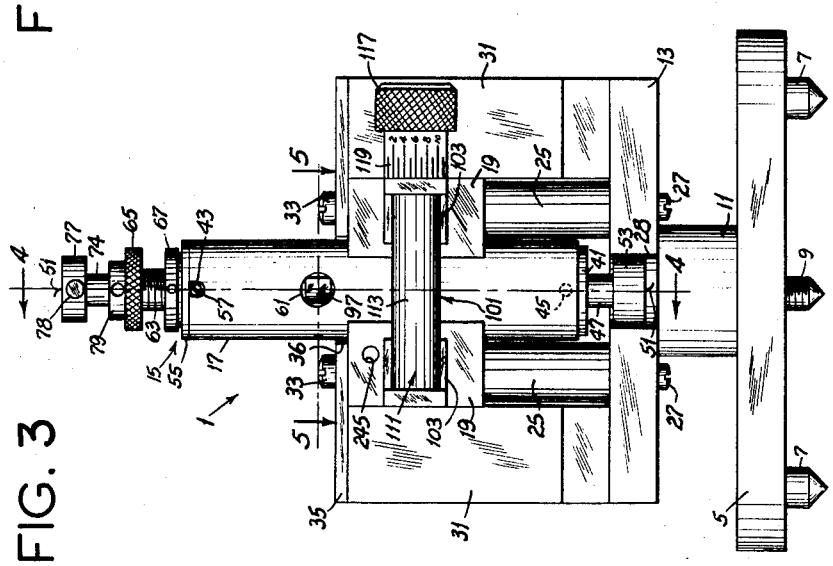
Fig. 3 is an enlarged front elevation of the accelerometer per se as viewed from the left in Fig. 1.

It is to be noted that two or three accelerometers of this invention may be used with one film recorder of this invention simultaneously to measure and record the components of a disturbance in different directions. For example, one accelerometer may be positioned for measuring the north-south component, another for measuring the east-west component, and a third for measuring the vertical component of a disturbance. In this respect it will be understood that a disturbance solely in the plane of the wire 51 and bar 91 will not cause an oscillation of the vibration system of the accelerometer. The accelerometer is shown as having a tapped hole 245 (see Fig. 3) in one of pole pieces 19 for receiving a prism or mirror to reflect the beam of light from the projector of the film recorder to the mirror of a second accelerometer and back to the recorder for making a double trace on one film.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In a torsional vibration system of the type having a wire and an eccentric weight on the wire, means for damping torsional vibration of the wire comprising a cylindrical sleeve of nonmagnetic electrically conductive material on the wire, and means for establishing a magnetic field concentrated on the sleeve, the eccentric weight being substantially outside the concentration.

2. In a torsional vibration system as set forth in claim 1, the sleeve being longitudinally slotted.

3. A damped torsional vibration system comprising means for establishing a magnetic circuit including a permanent magnet and opposed poles formed to concentrate a magnetic field across a gap between the poles, a wire extending transversely through the gap, a cylindrical sleeve of nonmagnetic electrically conductive material on the wire in the gap, and a weight carried by the sleeve outward of the gap.

4. A system as set forth in claim 3 wherein the weight comprises a bar of nonmagnetic material extending longitudinally of the sleeve and carried by spacers extending outward from the sleeve.

5. A system as set forth in claim 3 wherein the sleeve is electrically insulated from the wire and has longitudinal slots therein.

6. A system as set forth in claim 3, further including means for variably shunting the portion of the magnetic circuit across the gap.

7. A system as set forth in claim 6 wherein the shunting means comprises a pair of by-pass pole pieces extending from the poles, and a by-pass armature mounted for rotation at the ends of the by-pass pole pieces, said armature having magnetic and nonmagnetic sections arranged for varying the flux by-passed via the armature by rotating the armature to different positions.

8. An accelerometer, particularly for measuring acceleration of seismic disturbances, comprising a base, an assembly of a housing of nonmagnetic material and a pair of pole pieces located in slots in opposite sides of the housing mounted on the base, a C-shaped permanent magnet mounted on the base straddling the assembly with its poles extending across the outer ends of said pole pieces, a nonmagnetic cartridge telescoped in the housing and slidable out of the housing, said cartridge having a pair of opposed pole pieces located in slots in opposite sides thereof and registering with the pole pieces of the assembly, said cartridge pole pieces being formed to concentrate a magnetic field across a gap therebetween, said cartridge containing a torsional vibration system including a wire extending longitudinally in the cartridge from one of its ends to the other and fixed at its ends to the cartridge, wire, the housing and cartridge having registering window openings for passage of light to and from the mirror, a cylindrical damping sleeve of nonmagnetic electrically conductive material on the wire in the gap between the cartridge pole pieces, and an eccentric weight on the sleeve outward of the gap.

9. An accelerometer as set forth in claim 8 wherein the inner ends of the housing pole pieces are coincident with the inner surface of the housing, wherein the outer ends of the cartridge pole pieces are coincident with the outer surface of the cartridge, and wherein the cartridge pole pieces are of tapering cross section convergent toward the center of the cartridge and have curved inner end faces.

10. An accelerometer as set forth in claim 8, further comprising a pair of magnetic by-pass pole pieces extending forward from the housing pole pieces, and a rotary cylindrical armature extending across the ends of said by-pass pole pieces, said armature comprising a rod of magnetic material having part-cylindrical inserts of nonmagnetic material at the ends of the by-pass pole pieces.

11. For use in an accelerometer or the like, a cartridge having a pair of opposed pole pieces at opposite sides thereof with a gap therebetween, a torsional vibration system in the cartridge comprising a wire extending longitudinally in the cartridge from one of its ends to the other and fixed at its ends to the cartridge, a cylindrical damping sleeve of nonmagnetic electrically conductive material on the wire in the gap, an eccentric weight on the sleeve outward of the gap, and a mirror on the wire, the cartridge having a window opening for passage of light to and from the mirror.

References Cited in the file of this patent

UNITED STATES PATENTS

| | | |
|---|---|---|
| 1,303,099 | Michaelson | May 6, 1919 |
| 1,552,186 | Anderson | Sept. 1, 1925 |
| 1,669,135 | Kithil | May 8, 1928 |
| 1,672,892 | Kithil | June 12, 1928 |
| 1,810,021 | Legg | June 16, 1931 |

(Other references on following page)

UNITED STATES PATENTS

| | | |
|---|---|---|
| 1,869,828 | Shrader | Aug. 2, 1932 |
| 2,268,526 | Palmer | Dec. 30, 1941 |
| 2,356,608 | O'Bryan | Aug. 22, 1944 |
| 2,487,793 | Esval et al. | Nov. 15, 1949 |
| 2,542,018 | Ferrill | Feb. 20, 1951 |
| 2,552,722 | King | May 15, 1951 |
| 2,616,681 | Morrow | Nov. 4, 1952 |

FOREIGN PATENTS

| | | |
|---|---|---|
| 775,082 | France | Oct. 1, 1934 |
| 848,012 | France | Oct. 20, 1939 |

OTHER REFERENCES

"Public Roads," vol. 5, No. 9, November 1924, pages 1 to 3.